United States Patent [19]  [11] 3,841,856
Bondarev et al.  [45] Oct. 22, 1974

[54] METHOD OF PRODUCTION OF WHITE DIVITRIFIED GLASS MATERIAL

[76] Inventors: Konstantin Timofeevich Bondarev, Nizhnyaya Pervomaiskaya ulitsa, 33, kv. 171; Isai Davidovich Tykachinsky, ulitsa Fadeeva, 6, kv. 140; Nikolai Mikhailovich Pavlushkin, ulitsa Gotvalda, 14, kv. 44; Galina Vasilievna Kataeva, 11 Parkovaya ulitsa, 48, korpus 1, kv. 53, all of, Moscow; Viktor Stepanovich Kozlovsky, ulitsa Teatralnaya, 6a, kv. 22, Dolgoprudny Moskovskoi Oblasti; Mark Bentsionovich Romanovsky, 1-ya Pryadilnaya ulitsa, 7a, kv. 5, Moscow; Varvara Vasilievna Pyatnitskaya, 5 Parkovaya ulitsa, 10, kv. 115, Moscow; Svetlana Ivanovna Rud, ulitsa Pavla Korchagina, 10, kv. 6., Moscow

[22] Filed: Nov. 14, 1972

[21] Appl. No.: 306,556

[52] U.S. Cl. .................. 65/33, 65/90, 65/182 R, 106/39.6
[51] Int. Cl. .................. C03b 29/00, C03b 18/00
[58] Field of Search ............... 65/33, 182 R, 90; 106/39.6

[56] References Cited
UNITED STATES PATENTS

| | | | |
|---|---|---|---|
| 3,031,275 | 4/1962 | Shockley | 65/33 X |
| 3,170,780 | 2/1965 | Takehara et al. | 65/33 |
| 3,223,501 | 12/1965 | Fredley et al. | 65/33 X |
| 3,275,492 | 9/1966 | Herbert | 65/33 X |
| 3,282,711 | 11/1966 | Lin | 65/33 X |
| 3,464,807 | 9/1969 | Pressau | 65/33 |
| 3,497,366 | 2/1970 | Simmons | 65/33 X |

OTHER PUBLICATIONS
Handbook of Glass Manufacture, Vol. II Fay V. Tooley, pages 192–199.

Primary Examiner—S. Leon Bashore
Assistant Examiner—Frank W. Miga
Attorney, Agent, or Firm—Eric H. Waters

[57] ABSTRACT

For the production of white devitrified glass material, there is melted a melt having the composition thereof within a CaO - MgO - $Al_2O_3$ - $SiO_2$ system, whereafter there is used for working the melt opacified by phase demixing, and the formed glass band is crystallized in a single-stage process in accordance with which the glass is heated up at a rate of 5°C. to 10°C. to a temperature of 1050°C. to 1080°C., cured at this temperature for no more than an hour, and then cooled down to the vitrification point.

3 Claims, 2 Drawing Figures

PATENTED OCT 15 1974 3,841,856

METHOD OF PRODUCTION OF WHITE DIVITRIFIED GLASS MATERIAL

The present invention relates to glass-making, and, more particularly, it relates to a method of production of white devitrified glass material suitable for manufacture of articles that can be successfully used in industrial and civil engineering.

There is a known method of production of a white devitrified glass material, including the steps of melting a melt, working said melt and forming it into a band with subsequent crystallization.

The composition of this melt usually includes such relatively rare batch materials as pure oxides $B_2O_3$, $Li_2O$, $SiO_2$, $Al_2O_3$ and others, with addition of such crystallization catalysts as $TiO_2$, $ZrO_2$, PbO, SnO, and of glass structure modifiers $F_2$, ZnO, $P_2O_5$ and $BiO_2$. Melting is usually effected at high temperatures within a range from 1,600°C. to 1,700°C. at either oxidizing or reducing furnace atmosphere, with the melt being bubbled with either oxygen or nitrogen.

Working of the melt is effected with the viscosity from 10 to $10^2$ poise. Forming of the melt is effected either by casting or by moulding.

Thermal treatment of the material obtained is effected in a prolonged (in excess of 36 hours) double-stage crystallization process (see French Pat. No. 1,152,193 Cl.CO3b; British Pat. Nos. 848,447; 829,447; 863,569 Cl. 56–M 1163; Australian Pat. No. 254,999 Cl. 19.6; U.S. Pat. No. 3,117,881 Cl. 106–39; Japanese Pat. No. 42–172728 Cl. 30 b–221).

The known methods involve the use in a melt of relatively rare and expensive batch materials, which complicates and increases the cost of production of devitrified glass materials for construction purposes.

Besides, the presence of toxic additives ($F_2$, $P_2O_5$) results in pollution of the ambient atmosphere and hampers the production process; on the other hand, the presence of volatile solvents in the melt makes the process relatively unstable and difficult to keep under control.

Moreover, the high melting temperatures involve the employment of expensive refractory materials, of melting and crystallization furnaces of complicated structure furthermore, great amounts of power are consumed.

According to the known methods the melt of the viscosity from 60 to 200 poise is formed either by casting or moulding into individual articles.

Although it is possible in principle to form this melt into a band by continuous rolling techniques, however, this requires the creation of principally new production machinery.

The thermal treatment of the material, aimed at its crystallization and effected as a prolonged and complicated doublestage process, increases considerably the overall production time, and thus affects the productivity of the production plant.

It is an object of the present invention to create a method of production of white devitrified glass material, which should simplify the production process and step up its productivity, which should make it possible to manufacture the material in a sheet form by the continuous rolling techniques and which should bring down the cost of the material.

This object is attained in a method of production of white devitrified glass material, including the steps of melting a melt, working said melt and forming it into a band with subsequent crystallization, in which method, in accordance with the invention, said melt being melted has the composition thereof within the CaO - MgO - $Al_2O_3$ - $SiO_2$ system, said working being performed upon said melt opacified by phase segregation or demixing, said formed band being crystallized in a single-stage process wherein said material is heated at a rate of 5°C. to 10°C. a minute to a temperature from 1,050°C. to 1,080°C., then cured at this temperature for no more than an hour and subsequently is cooled down to the vitrification point.

The band of the glass material can be crystallized either on a gas-air cushion, or else on a molten metal surface.

The essence of the present invention is as follows.

The melt employed having the composition within the CaO - MgO - $Al_2O_3$ - $SiO_2$ system, it is prepared with fairly common batch materials, such as sand, limestone or chalk, dolomite and sodium carbonate, quite unlike the above-specified known method which involves the use of synthetic batch materials in the form of pure oxides $B_2O_3$, $Li_2O$, $Al_2O_3$, $SiO_2$, $ZrO_2$, PbO, SnO, and others.

The use of inexpensive batch materials makes it possible to reduce considerably the production cost, to simplify the production, and, finally, to set up highly-productive manufacture of devitrified glass materials for construction uses.

The herein-disclosed method is practiced with the glass composition that lies in the metastable liquation zone of the binary $SiO_2$ - CaO and ternary $SiO_2$ - $Al_2O_3$ - CaO equilibrium diagrams.

The glass compositions may include the oxides in the following proportion by weight.

$SiO_2$ + CaO not less than 90 parts by weight and at least one of the following oxides: MgO, $Al_2O_3$ and $Na_2O$ up to 3 parts by weight.

These compositions yield, directly at working and forming, white glass melt opacified by phase demixing.

The process of phase demixing takes place at a high rate at temperatures from 1,410°C. to 1,450°C., and, therefore, the method in accordance with the present invention, unlike the herein-above specified known methods, needs no expensive, rare, toxic and volatile additives — crystallization catalysts PbO, SnO, $TiO_2$, $ZrO_2$ and glass structure modifiers $P_2O_5$, $F_2$, ZnO.

The glass melt, opacified by phase demixing, displays adequate working properties characterized by the viscosity from 300 to 560 poise; it is worked by a stream feeder (forehearth) at a temperature of 1,410° ± 10°C. into a rolling machine, to be formed into a continuous band.

The employment of the glass mass opacified by phase demixing and having liquation structure with drop size from 0.1 to 0.5 microns and quantity from $10^9$ to $10^{12}$ particles per cubic mm makes it possible to do away with the first prolonged low-temperature stage of the thermal treatment of the glass, in order to obtain its pre-crystallization structure. The use of the metastably segregated glass melt, opacified by phase demixing, further enables to effect the thermal treatment of the formed glass band not under the glass-working temperatures (600°C. to 700°C.), but under high temperatures, as high as 850°C. to 900°C., the rate of the heating to the main top crystallization point being as high as 5°C. to 10°C. a minute.

The high-temperature processes of bulk crystallization of glass have higher rates, in which way it has become possible to both simplify and shorten the labour-consuming and lengthy operation of the thermal treatment of the glass.

The thermal treatment of the glass at a temperature from 1,050°C. to 1,080°C., of a duration not in excess of 1 hour, enables to obtain fine-crystalline structure of the material, uniformly throughout the bulk thereof. In the process of crystallization there is formed the crystalline phase of wollastonite rendering the material white, wear-resistant, resistant to compression loads, as well as to the action of acids and alkalies.

This wollastonite devitrified glass material, after it has passed the vitrification point of 710°C., can be cooled down at any desired high rate.

The employment of high-temperature processes in combination with the single-stage process of the thermal treatment of the glass enables to cut the crystallization time from 36 hours to mere 1.5 hours and to produce white devitrified glass material in the form of a continuous band, and that at a high production rate.

It should be noted that the herein-disclosed process can be carried out with thermal treatment furnaces of greatly simplified structure and far less expensive in construction. All the abovesaid, taken together, results in the production of inexpensive white devitrified glass materials for a broad variety of uses in construction.

The material produced by the herein-disclosed method can be either surface-coloured with various ceramic colours, or else it can be batch-coloured by addition of various colouring agents. For instance, it can be batch-coloured by addition of the following oxides to its composition: MnO, FeO, NiO, CoO, $Cr_2O_3$, $Fe_2O_3$, and others.

Crystallization of the sheet glass in the form of a continuous band can be effected in a mould with an air-gas cushion. The employment of a gas-air cushion mould enables to effect crystallization of glass of any composition, including compositions that are susceptible to deformation in the course of thermal treatment; it further enables to effect thermal treatment of the glass having a reduced viscosity within a range from $10^7$ to $10^9$ poise, as well as to intensify the process of crystallization of the glass, due to the process being carried under optimal conditions, such as elevated temperatures and reduced viscosity. Under such conditions the generation of the crystallization centres takes place at a considerably higher rate.

The employment of an air-gas cushion mould offers a higher degree of crystallization and a uniform internal structure of the material, which results in its high mechanical, chemical and wear-resistance properties. This is due to a more uniform distribution of the temperature and to the good heat exchange conditions, ensured by thermal treatment of the glass on an air-gas cushion; furthermore, the time of thermal treatment can be cut by 30 to 50 percent, in which way the productivity of the plant producing devitrified glass materials is stepped up.

In accordance with the herein-disclosed method, white devitrified glass material in the sheet form can be produced from the following batch materials: sand, limestone, clay, dolomite, chalk and sodium carbonate.

The invention will be further described in connection with several examples, with reference being had to the accompanying drawings, wherein.

EXAMPLE 1

Figure 1:
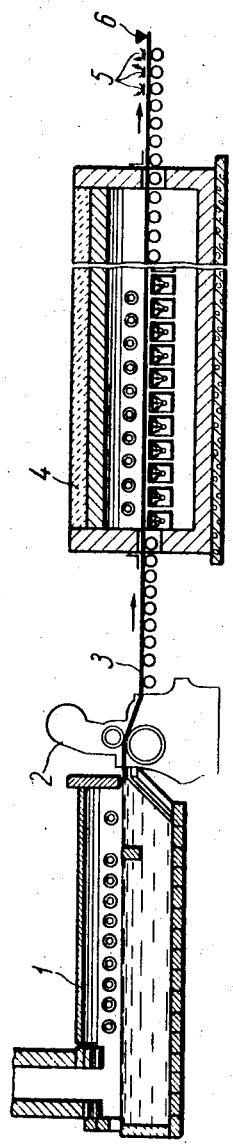
FIG. 1 illustrates schematically a longitudinal sectional view of a plant for production of white devitrified glass material in the sheet form, with the crystallization being effected on an air-gas cushion.

The batch is prepared from natural batch materials: sand, limestone, chalk, clay and broken glass. The batch is melted into a glass of the following composition (percent by weight):

| $SiO_2$ | CaO | MgO | $Al_2O_3$ | $Na_2O$ |
|---|---|---|---|---|
| 70.0 | 22.8 | 2.4 | 2.8 | 2.0 |

The melting is effected at a temperature from 1,550°C. to 1,580°C. in a melting tank 1 (FIGS. 1 and 2), with subsequent refining of the melt, homogenization and cooling down to the working temperature.

In the course of being worked and formed, the melt is opacified by phase demixing, whereby the material attains a liquation structure in the form of enclosed droplets and becomes white in colour.

The melt is worked at a temperature of 1,410° ± 10°C. through a stream feeder (not shown in the drawings). The melt is further formed, or shaped in a rolling machine 2 into a band 3 which is 1 metre to 3 metres wide and 8 mm to 20 mm thick.

Figure 2:
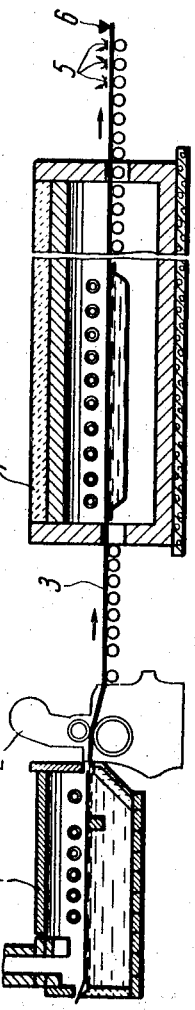
FIG. 2 shows the same plant, as in FIG. 1, but with the crystallization being effected on the surface of molten metal.

The glass band is crystallized in a mould 4 (FIG. 1) which is of an air-gas cushion type, by a single-stage thermal treatment process. The glass band 3 is heated up, starting from about 900°C., at a rate from 5°C. to 10°C. a minute to a temperature of crystallization from 1,050°C. to 1,080°C. and is cured at this temperature for one hour. The devitrified glass material thus obtained is cooled down and polished in a polishing unit 5 (FIGS. 1 and 2). The band 3 is then cut into panels of desired size by diamond saws 6.

EXAMPLE 2

White devitrified glass material in the form of a continuous band is produced in a manner similar to that described hereinabove in Example 1, but the crystallization of the glass band is effected in a mould 4 (FIG. 1) of the air-gas cushion type in a more rapid single-stage thermal treatment process.

The glass band 3 at a temperature of 870°C. is forwarded from the rolling machine 2 onto the air-gas cushion, where it is heated up at a rate of 10°C. a minute to the crystallization temperature of 1,050°C. and cured at this temperature for half an hour.

EXAMPLE 3

White devitrified glass material is produced in the way described hereinabove in Example 1, but the thermal treatment of the continuous glass band 3 is effected in a mould 7 (FIG. 2) on the surface of molten metal.

The devitrified glass material produced by the herein disclosed method, in accordance with the Examples 1 to 3, has the following properties:

| | |
|---|---|
| specific gravity | 2.43 gr/cu.cm |
| thermal expansion (30°C. to 900°C.) | 54.10⁻⁷ per °C |
| dilatometric softening point | 900°C. |
| bending strength | 850 + 50kg/sq.cm |
| compression strength | 4000 + 50kg/sq.cm |
| chemical stability (weight loss): | |
| in water | 0.07 % |
| in alkali | 2.33 % |
| in acid | 0.11 % |

What is claimed is:

1. A method for the production of white devitrified glass material comprising the steps of melting natural batch materials of sand, limestone, chalk, clay and broken glass and forming a glass melt having a composition of $SiO_2$, $CaO$, $MgO$, $Al_2O_3$ and $Na_2O$, heating said melt to temperatures from 1,410°C. to 1,450°C. and opacifying said melt by phase demixing, forming a glass band of said melt, heating said glass band to a temperature from 1,050°C. to 1,080°C. at a rate of 5°C. to 10°C. a minute and crystallizing said glass band, curing said glass band for a period of time not exceeding 1 hour, cooling said glass band to the vitrification point and forming a white devitrified glass, and said crystallizing, curing and cooling taking place in a single stage.

2. A method according to claim 1, wherein the glass band is supported on an air-gas mixture during crystallization.

3. A method according to claim 1, wherein the glass band is supported on a molten metal surface during crystallization.

* * * * *